(12) United States Patent
Baudard

(10) Patent No.: US 6,703,929 B2
(45) Date of Patent: Mar. 9, 2004

(54) AUTOMOBILE VEHICLE EQUIPPED WITH HANDS-FREE SYSTEM HAVING A RECEPTION ANTENNA LOCATED ON STEERING COLUMN

(75) Inventor: Xavier Baudard, Paris (FR)

(73) Assignee: Valeo Electronique, Creteil (FR)

( * ) Notice: Subject to any disclaimer, the term of this patent is extended or adjusted under 35 U.S.C. 154(b) by 180 days.

(21) Appl. No.: 09/953,853

(22) Filed: Sep. 18, 2001

(65) Prior Publication Data

US 2002/0033754 A1 Mar. 21, 2002

(30) Foreign Application Priority Data

Sep. 18, 2000 (FR) ............................................. 00 11867

(51) Int. Cl.[7] ............................. B60R 25/10; G06F 7/00
(52) U.S. Cl. .......................... 340/426.13; 340/426.31; 340/426.36; 340/426.16; 340/825.69; 340/825.72; 307/10.1; 123/179.2; 701/36
(58) Field of Search ....................... 340/426.1, 426.13, 340/426.15, 426.16, 426.31, 426.35, 425.5, 825.69, 825.72, 5.6, 5.61, 426.36; 307/10.1–10.6, 9.1; 123/179.1, 179.2; 701/36, 49

(56) References Cited

U.S. PATENT DOCUMENTS 5,689,142 A    11/1997  Liu ............................ 307/10.5
6,181,026 B1 *  1/2001  Treharne et al. ........... 307/10.3
6,529,124 B2 *  3/2003  Flick .......................... 340/426
2001/0028196 A1 * 10/2001  Burr et al. .................. 307/10.1

FOREIGN PATENT DOCUMENTS

DE      WO 99/29543      6/1999

* cited by examiner

Primary Examiner—Donnie L. Crosland
(74) Attorney, Agent, or Firm—Liniak, Berenato & White

(57) ABSTRACT

An automobile vehicle equipped with a "hands-free" access and/or engine starting system controlled by a management logic subassembly and equipped with a radio receiver subassembly, which includes at the top of the vehicle's steering column a radio antenna and which converts radio signals received by said antenna into signals exploitable by said management logic subassembly to enable it, when it recognizes said signals as coming from an identification device of a predetermined user, to authorize or trigger an operation in the vehicle, said management logic subassembly, said radio receiver subassembly and said antenna being integrated in and interconnected by an electronic board, wherein this electronic board also includes a subassembly providing interfaces with "on-the-column" control and/or signaling parts mounted on the vehicle's steering column or steering wheel and/or on one or more satellite modules mounted on this steering column.

7 Claims, 1 Drawing Sheet

AUTOMOBILE VEHICLE EQUIPPED WITH HANDS-FREE SYSTEM HAVING A RECEPTION ANTENNA LOCATED ON STEERING COLUMN

BACKGROUND OF THE INVENTION

The invention relates to an automobile vehicle equipped with a so-called "hands-free" access and/or engine starting control system including a receiving antenna located on the vehicle's steering column.

DESCRIPTION OF THE PRIOR ART

There are known automobile vehicle "hands-free" systems that enable a user carrying an identification device (or identifier) to control parts of the vehicle, for example the door locks or the engine starting system, simply by entering a delimited zone close to the vehicle, the identifier being recognized by control means installed in the vehicle. The identifier is generally constituted by a transponder which, when it receives signals emitted by the vehicle to detect its presence, responds by emitting a radio signal. A receiving antenna in the vehicle, fitted for example at the top of the steering column, picks up these response signals. It is connected to a radio receiver subassembly which converts the signals received by the antenna into a form acceptable by a management logic subassembly assuring the control functions. This management logic subassembly checks whether or not the signals received match a predetermined signal characteristic of a specific identifier. If the match is established, the emitting identifier is considered to be authenticated and the system then authorizes or triggers at least one predetermined action in the vehicle.

In known systems, the management logic subassembly is located at some distance from the radio receiver subassembly and the receiving antenna, in particular when this antenna is situated near the top of the steering column as mentioned above. This arrangement is not optimal in terms of cost and efficiency. In particular the long transmission delays of the received signals are not conducive to the fast response to the received signals.

Moreover, known systems often have numerous wire connections running along at feast part of the vehicle's steering column, from the top of the column to the rest of the vehicle to connect the various electrical control and/or signaling parts which are often mounted on the steering column, the steering wheel and/or on specialized satellite modules on the column.

SUMMARY OF THE INVENTION

The invention is therefore an automobile vehicle equipped with a "hands-free" access and/or engine starting system controlled by a management logic subassembly and equipped with a radio receiver subassembly, which includes at the top of the vehicle's steering column a radio antenna and which converts radio signals received by said antenna into signals exploitable by said management logic subassembly to enable it, when it recognizes said signals as coming from an identification device of a predetermined user, to authorize or trigger an operation in the vehicle, said management logic subassembly, said radio receiver subassembly and said antenna being integrated in and interconnected by an electronic board, wherein this electronic board also includes a subassembly providing interfaces with "on-the-column" control and/or signaling parts mounted on the vehicle's steering column or steering wheel and/or on one or more satellite modules mounted on this steering column.

According to a characteristic of the invention, an electronic board fitted at the top of the steering column carries said antenna and integrates said management logic subassembly of said "hands-free" system and said radio receiver subassembly that it interconnects. This arrangement notably increases the processing speed of the identifier authentication operations and therefore reduces the time necessary to trigger an action by the "hands-free" system when an identifier is authenticated.

In a variant of the invention, the electronic board at the top of the steering column integrates the management logic subassembly of the "hands-free" system, the radio receiver subassembly and an interface subassembly providing interfaces with "on-the-column" control and/or signaling systems mounted on the vehicle's steering column or steering wheel and/or on one or more satellite modules fitted on this steering column.

In a variant of the invention, the interface subassembly is controlled by the management logic subassembly, to which it is connected via the electronic board. This enables use of the processing capacities of the management logic subassembly for processes other than those relating directly to the "hands-free" system, provided this management logic subassembly has multitasking ability.

In a variant of the invention, the electronic board at the top of the steering column is connected to a serial bus-type digital data transmission link which is shared to handle communication between various vehicle subassemblies and/or systems transmitting and/or receiving data. This bus is used by at least one of the subassemblies of the electronic board and/or by on-the-column control and signaling parts connected to at least one of these subassemblies.

BRIEF DESCRIPTION OF THE DRAWINGS

The invention will be better understood and other characteristics and advantages will become clear on reading the following detailed description of a preferred embodiment, given only as a non-limitative example, with reference to the attached drawings of which.

DETAILED DESCRIPTION OF A PREFERRED EMBODIMENT

Figure 1:
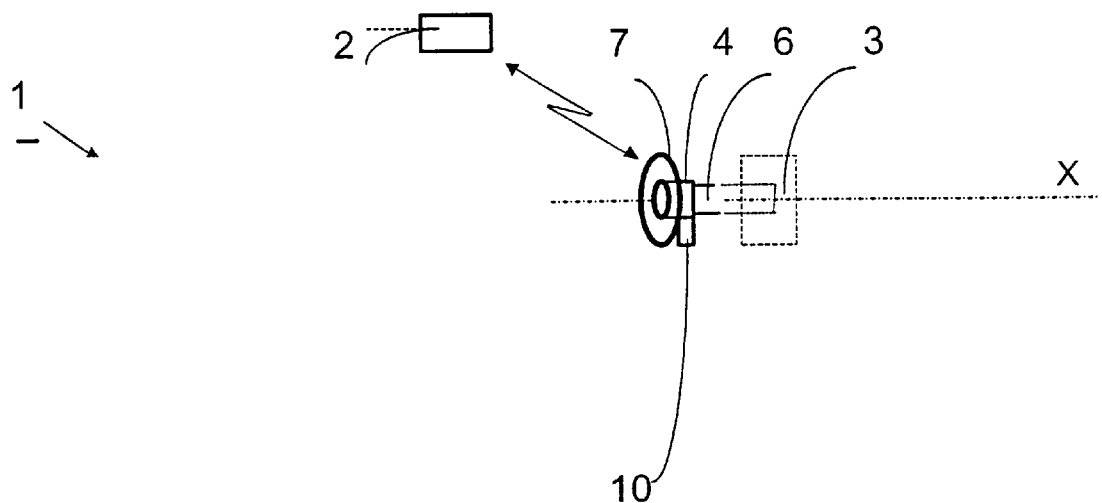
FIG. 1 is a diagram of an automobile vehicle, seen from above, equipped with a prior art "hands-free" system including a receiving antenna located at the top of the steering column of the vehicle.

The automobile vehicle 1 shown in FIG. 1 is equipped with a "hands-free" access and/or engine starting system enabling a user carrying an identifier 2 to control at least one part of the vehicle simply by entering in a delimited area within radio receiving distance of the vehicle. The part can be for example the vehicle's door locks or the engine starting system.

In this known system, the identifier 2 is generally a transponder which reacts to radio signals emitted by the vehicle to detect the presence of the identifier, by returning a radio response signal.

The "hands-free" system includes a management logic subassembly 3 mounted in the vehicle. It includes, in a known manner, a processor and at least one programmed memory (not shown in the figures). It also includes a radio receiver subassembly 4 equipped with a receiving antenna 5. This radio receiver subassembly and antenna are here mounted at the top of the steering column 6 which carries the steering wheel 7 used to guide the vehicle.

The steering column 6 is oriented along an axis X at least in an upper section. It often carries an interface board to which are electrically connected control parts, such as rocker or push-button switches for example, and signaling parts, notably of the indicator light type, which are connected by conducting wires to parts belonging to subassemblies mounted inside the vehicle. These wires run along the column 6, over at least part of their path, in a known manner not shown in FIG. 1.

Figure 2:
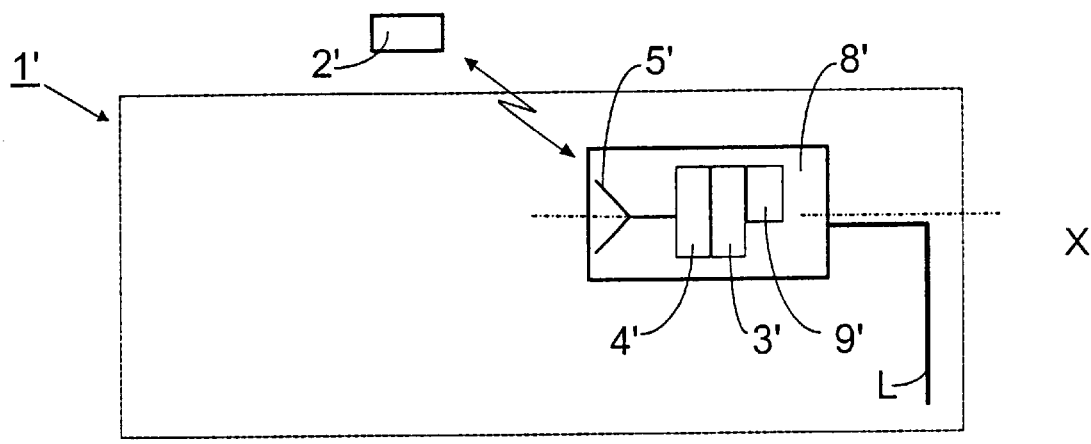
FIG. 2 is a simplified diagram of an automobile vehicle equipped with the "hands-free" access and/or starting system according to the invention.

According to the invention and as shown in FIG. 2, an electronic board 8' is fitted at the top of the steering column (here symbolized by its axis X) of the vehicle 1'. This board is provided to integrate the receiving antenna 5', the radio receiver subassembly 4' and the management subassembly 3' of the vehicle's "hands-free" system.

The electronic board 8' carries conducting tracks linking the components of the subassemblies integrated in the board or provided to enable interconnection of these subassemblies in a predetermined manner. This integration of subassemblies on the electronic board reduces the distances between components of the "hands-free" system that are involved in the processing of identification signals from a user's identifier 2'. Short transmission delays are thereby obtained for the identification signals which are fed to the management logic subassembly 3' after being picked up by the receiving antenna 5' and converted by the radio receiver subassembly 4' into a form usable by said management logic subassembly.

In a variant of the invention, the electronic board 8' also includes an interface subassembly 9' for so-called "on-the-column" control and/or signaling parts mounted on the vehicle steering column or steering wheel and/or on satellite modules 10 mounted on this steering column. These arrangements are not illustrated here since they are known to professionals of the art.

The presence of the management logic subassembly 3' can be advantageously exploited to control the interface subassembly 9' and at least some of the parts connected to it, possibly assuring preprocessing of the signals sent or received by these parts.

In a preferred embodiment, the electronic board 8' at the top of the steering column is connected to a bi-directional serial bus-type digital link L which is shared by different vehicle subassemblies and parts that send or receive digital signals. The link L then replaces the harness of electrical wires which would be required long the steering column to connect so called "on-the-column" control and/or signaling parts. The digital bus is used for the communication purposes mentioned previously by at least one subassembly integrated in the electronic board 8', for example by the management logic subassembly 3' and the interface subassembly 9' in the present embodiment. If need be, it can be also directly used for the same purposes by one or more of the "on-the-column" control and/or signaling parts.

What is claimed is:

1. Automobile vehicle having a vehicle steering wheel and a vehicle steering column, the automobile vehicle equipped with a "hands-free" access and/or engine starting system controlled by a management logic subassembly (3') and equipped with a radio receiver subassembly (4'), which includes at the top of the vehicle steering column a radio antenna (5') and which converts radio signals received by said antenna into signals exploitable by said management logic subassembly to enable said management logic subassembly, when said management logic subassembly recognizes said signals as coming from an identification device (2') of a predetermined user, to authorize or trigger an operation in the vehicle, said management logic subassembly (3'), said radio receiver subassembly (4') and said antenna (5') being integrated in and interconnected by an electronic board (8'), wherein said electronic board also includes a subassembly (9') providing interfaces with "on-the-column" control and/or signaling parts mounted on the vehicle steering column or the vehicle steering wheel and/or on one or more satellite modules mounted on the vehicle steering column.

2. Automobile vehicle according to claim 1, in which said interfaces subassembly (9') is controlled by said management logic subassembly (3') to which said interfaces subassembly is connected via said electronic board (8').

3. Automobile vehicle according to claim 1, in which said electronic board (8'), located at the top of the vehicle steering column, is connected to a serial bus-type digital data transmission link (L) which is shared by various vehicle subassemblies and parts transmitting and/or receiving digital signals, and which is used for communication purposes by at least one of said subassemblies on said electronic board and/or by "on-the-column" control and signaling parts connected to said subassemblies.

4. An automobile vehicle comprising:
   a vehicle steering wheel;
   vehicle steering column having a top;
   at least one vehicle-mounted member selected from an "on-the-column" control part mounted on at least one of the vehicle steering column and the vehicle steering wheel, an "on-the-column" signal part mounted on at least one of the vehicle steering column and the vehicle steering wheel, and a satellite module mounted on the vehicle steering column; and
   at least one "hands-free" system selected from an access system and an engine starting system, the system comprising
      an identification device of a predetermined user;
      a management logic subassembly controlling the system;
      a radio receiver subassembly, comprising a radio antenna located at the top of the vehicle steering column, for converting radio signals received by said radio antenna into signals exploitable by said management logic subassembly for enabling the management logic subassembly, when the said management logic subassembly recognizes said radio signals as coming from said identification device, to authorize or trigger an operation in the vehicle; and
      an electronic board integrating and interconnecting said management logic subassembly, said radio receiver subassembly and said antenna, said electronic board comprising a subassembly interfacing with said at least one vehicle-mounted member.

5. An automobile vehicle according to claim 4, wherein said management logic subassembly controls said interfacing subassembly, and wherein said electronic board connects said management subassembly to said interfacing subassembly.

6. An automobile vehicle according to claim 4, further comprising:
   a serial bus-type digital data transmission link; and
   a plurality of vehicle subassemblies and parts for transmitting and/or receiving digital signals, said vehicle subassemblies and parts being shared by said serial bus-type digital data transmission link and connected to said "on-the-column" control and signal parts, wherein said electronic board is located at the top of the vehicle steering column and is connected to said serial bus-type digital data transmission link, which is used for communication purposes by at least one of said vehicle subassemblies and/or by at least one of said "on-the-column" control and signal parts.

7. An automobile vehicle according to claim 5, further comprising:

a serial bus-type digital data transmission link; and a plurality of vehicle subassemblies and parts for transmitting and/or receiving digital signals, said vehicle subassemblies and parts being shared by said serial bus-type digital data transmission link and connected to said "on-the-column" control and signal parts, wherein said electronic board is located at the top of the vehicle steering column and is connected to said serial bus-type digital data transmission link, which is used for communication purposes by at least one of said vehicle subassemblies and/or by at least one of said "on-the-column" control and signal parts.

* * * * *